R. C. PARENT.
SOLDERING IRON.
APPLICATION FILED JUNE 1, 1920.
Reissued Sept. 27, 1921. 15,202.
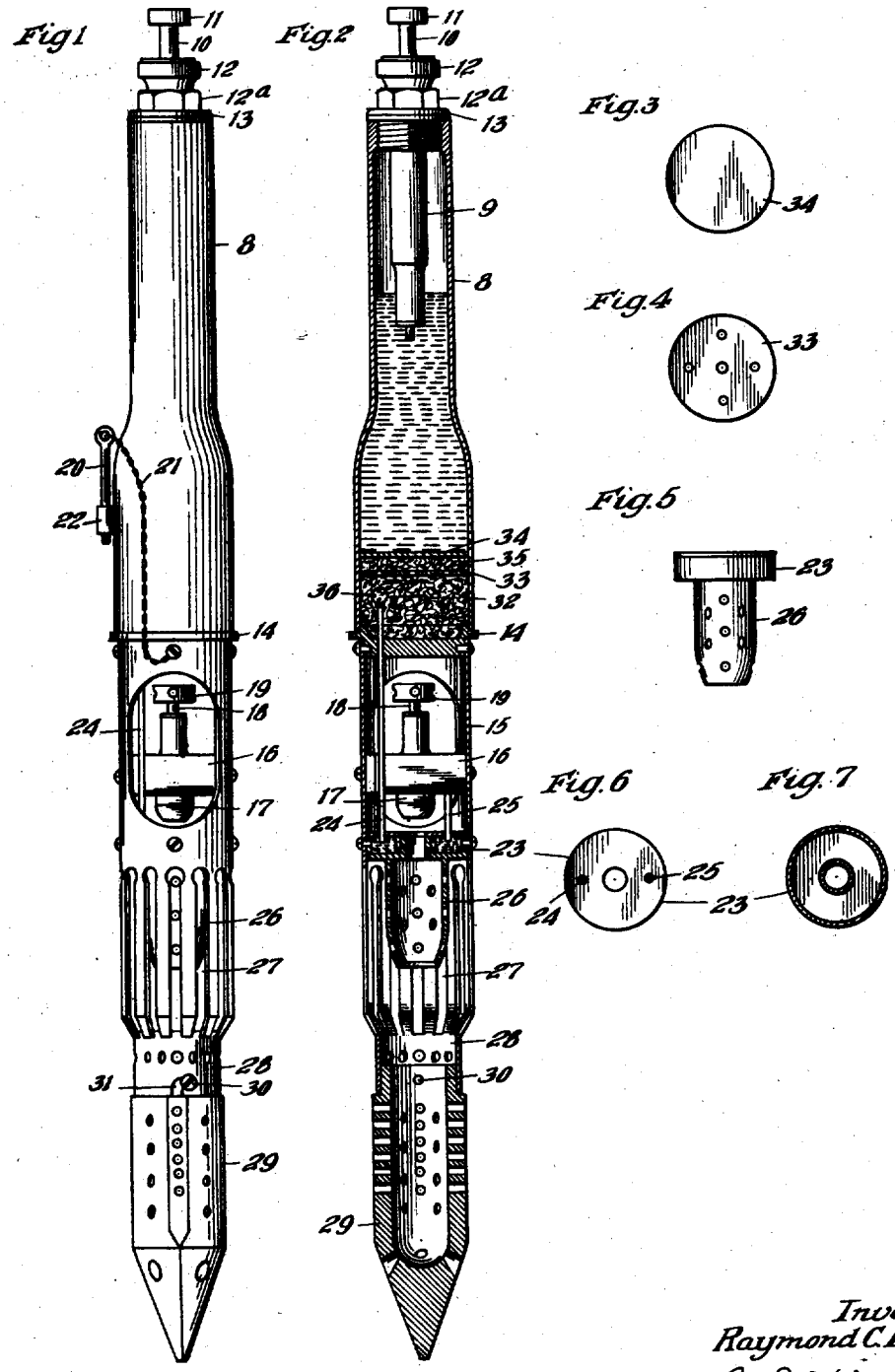
Inventor
Raymond C. Parent
By Geo. D. Haight
His Atty.

UNITED STATES PATENT OFFICE.

RAYMOND C. PARENT, OF CHICAGO, ILLINOIS.

SOLDERING-IRON.

15,202. Specification of Reissued Letters Patent. Reissued Sept. 27, 1921.

Original No. 1,303,716, dated May 13, 1919, Serial No. 268,527, filed December 27, 1918. Application for reissue filed June 1, 1920. Serial No. 385,851.

*To all whom it may concern:*

Be it known that I, RAYMOND C. PARENT, a citizen of the United States, residing at Chicago, in the county of Cook and State of Illinois, have invented a certain new and useful Improvement in Soldering-Irons, of which the following is a full, clear, concise, and exact description, reference being had to the accompanying drawings, forming a part of this specification.

My invention is an improvement in soldering-irons of that particular type in which the head or soldering-point is heated by means of a burner forming part of the implement and supplied with liquid fuel from a reservoir in the handle, commonly known as self-heating soldering irons.

The principal object of my present invention is to provide an implement of this general character which is simple and compact in construction, easily and conveniently operated, and in use will effect the heating of the head or iron uniformly at any temperature desired so as to greatly facilitate the operation of soldering all kinds of work for which the ordinary soldering-iron is adapted.

A further object of my invention is to provide a self-heating soldering-iron in which provision is made for supplying liquid fuel from the handle to the burner irrespective of the position in which the implement is held, whereby fuel will be fed to the burner to maintain the head or iron properly heated when the implement is turned upside down for overhead work.

Another object of my invention is to so construct the soldering implement that when the soldering-head or iron is removed a very handy and effective blow-torch is furnished which may be used for accomplishing any kind of work required of a device of such nature.

Other objects and advantages of my invention will hereinafter appear, and what I particularly claim as my invention and desire to protect by Letters Patent is more specifically set forth in the appended claims.

In the accompanying drawings, forming a part hereof: Figure 1 is a side elevation of a self-heating soldering-iron constructed in accordance with my invention. Fig. 2 is a longitudinal sectional view through the same. Figs. 3 and 4 are detail views of disks located in the reservoir-handle to confine packings therein. Fig. 5 is a detail side elevation of the combined vaporizer and burner-tube. Fig. 6 is a plan view of the same, and Fig. 7 is a transverse sectional view through the vaporizer. Like numerals of reference indicate like parts in all the figures of the drawings.

Referring to the drawings, 8 designates the handle of the implement which is made hollow and of a size to hold an ample supply of the liquid fuel, as gasolene, employed for heating the head or point of the soldering-iron; and as the liquid fuel is fed under pressure to the burner said handle is provided at its upper end with an air-pump 9, of any conventional type of construction operated in the usual manner by a plunger-rod 10 having a gripping knob 11. For convenience in attaching the air-pump to the handle it is carried by a screw-cap 12 which closes the outer end of said handle, these parts being removable for the purpose of filling the reservoir. The cap may be, and preferably is, provided with a wrench receiving portion 12[a], and interposed between the cap and reservoir handle is a leather washer 13, to provide a tight joint.

The reservoir handle is enlarged at its lower portion, as shown, to provide a larger fuel capacity below the gripping portion and to receive certain means, hereinafter described, for accomplishing the feed of liquid fuel or gasolene to the burner when the implement is turned upside down. The bottom of the reservoir handle is in the form of a thick cup-shaped disk 14, with an annular recess at its upper outer edge to receive the lower end of the cylindrical body portion of said handle, and a deeper annular recess at its lower edge to receive the upper end of a yoke 15, which carries the burner and soldering-head of the implement. The disk or bottom is welded in the cylindrical portion of the handle and the yoke is detachably connected thereto by means of screws which are threaded into said disk, permitting the yoke to be removed from the handle so that the burner and other parts secured therein may be withdrawn through the upper end for examination and repair.

Within the yoke near the upper end thereof is located a conventional form of burner 16, having the usual discharge nozzle 17 and needle-valve operating-stem 18, the latter being provided at its upper end with a turning-wheel 19 which may have the usual milled edge but is preferably provided with holes to receive a pin 20 by which leverage-power can be applied in manipulating the valve, and in order that said pin will be always conveniently at hand it is connected to the implement by a chain 21 and held in a clip 22 attached to the handle. The operating-wheel for the valve of the burner is accessible through opposite openings in the yoke, and through these openings the required supply of air passes to the burner-tube 26 to mix with the gasolene discharged from the burner. The perforated burner-tube or mixing-chamber 26 is located within the yoke a short distance below the burner, and in the present instance is combined with an auxiliary reservoir 23 from which it depends; said auxiliary reservoir being in the form of a hollow ring through the center of which the gasolene and air pass to the burner-tube or mixing chamber.

The gasolene or other liquid fuel is conducted to the auxiliary reservoir by a pipe 24 extending from the lower part of the reservoir handle, and is fed from said auxiliary reservoir to the burner by means of a short pipe 25. By this arrangement a supply of gasolene for the burner is maintained in the auxiliary reservoir and heated by the combustion in the burner-tube so that it will quickly vaporize when discharged from the burner.

Below the auxiliary reservoir or vaporizer and surrounding the perforated burner-tube the yoke is provided with elongated air openings 27 extending to the ring 28 which forms the end of the yoke and end of the blow-torch when the implement is used as such, and into this ring the reduced end of the soldering-head or point 29 fits. The soldering-head is chambered, as shown, to receive the flame from the burner and is detachably connected by a screw 30 thereon fitting into a bayonet-slot 31 in the aforesaid ring, so that soldering-heads of different sizes may be used in connection with the implement and readily applied, as well as permitting the implement to be used as a blow-torch when the soldering-head is removed, as will be understood.

The ring 28 of the yoke and the body of the soldering-head are provided with suitably disposed air-inlet holes, and the soldering-head is also provided near its point with outlet holes leading from the inner end of the chamber, the latter terminating to leave a sufficient body of metal to retain heat and produce an effective soldering-point.

In order to insure a supply of gasolene to the burner when the implement is turned point upward for overhead work in use as a soldering-iron, or general use as a blow-torch, a packing of preferably raw cotton is placed in the lower end of the reservoir-handle and the supply pipe 24 from vaporizer extended into it. This packing, 32, is held in place by a perforated disk 33 secured in the hollow handle, and in addition to the aforesaid packing I employ a second packing 35 on which is placed a preferably leather disk 34 through which the gasolene permeates to thoroughly saturate the packings, whereby said packings retain a supply of the fuel that is gradually fed to the burner when the implement is held upside down and the gasolene in the handle flows away from the leather disk; in other words the gasolene will permeate the leather disk when the point of the implement is turned upward. I have found by actual tests that when the handle is provided with the packing and leather disk the burner device will maintain an effective flame with the implement turned upside down for quite a long while, although the body of gasolene in the handle is then away from the leather disk and compressed air in between. To protect the inner end of the supply pipe 24, where it terminates in the packing 32, it is provided with a perforated cap 36. When the iron is held upside down, or in an inverted position, the main supply of gasolene will obviously fall away from the packing and disks and the compressed air within the reservoir will assume an uppermost position. The packing and disks 32, 33, 34 and 35 form a barrier, when the iron is held in such inverted position, between the air and the bulb end 36 of the feed pipe 24 so as to prevent air from entering said feed pipe and consequently interrupting the flow of fuel to the burner. In such inverted position of the iron also the compressed air exerts a certain pressure on the disk 34 which is transmitted through the packing 35 and disk 33 to the packing 32 which assists in squeezing out or feeding the fuel trapped or held in the packing 32 into the bulb head 36.

The operation of the implement will be readily understood by those skilled in this art, for after the burner is started by heating the vaporizer in any suitable manner, as by an open flame from burning gasolene, usual in devices of this character, the soldering-head will be kept heated by the flame from the burner and the degree of heat may be regulated by manipulating the valve in the manner hereinbefore described. After proper adjustment of the valve, the solder-head will be kept at a uniform degree of heat so that the operator may use the implement continuously, and by the particular construction of the feeding device for the gasolene said implement may be held in any position for soldering work of all kinds. By simply removing the soldering-head the implement is ready for use as a blow-torch, and in this instance the flame is discharged from the end of the yoke.

Instead of detachably connecting the soldering-head to the yoke by means of screws and bayonet-slots, as herein shown and described, I may employ any other well known form of connection; and it will be apparent, also, that other details in the general construction of the implement may be changed or modified within the scope of my claims.

I claim:

1. A self-heating implement for the purposes set forth comprising a reservoir-handle, a yoke connected thereto and having openings in its sides, a burner including a needle valve secured within the yoke and accessible through openings therein for adjusting the needle-valve, feed pipes extending from the reservoir-handle to the burner, a fiber packing in the lower end of the reservoir into which the feed pipe extends, and a leather disk on top of the packing through which the liquid fuel permeates to said packing.

2. A self-heating implement for the purposes set forth comprising a reservoir-handle, a yoke connected thereto and having openings in its sides, a burner including a needle valve secured within the yoke and accessible through openings therein for adjusting the needle-valve, feed pipes extending from the reservoir-handle to the burner, a fiber packing in the lower end of the reservoir into which the feed pipe extends, and a leather disk on top of the packing and through which the liquid fuel permeates to said packing; together with means at the outer end of the yoke for detachably connecting a soldering head thereto.

3. A self-heating implement for the purposes set forth comprising a reservoir-handle, a yoke connected thereto and having openings in its sides, a burner including a needle valve secured within the yoke and accessible through openings in the latter for adjusting the needle-valve, feed pipes extending from the reservoir-handle to the burner, a fiber packing in the lower end of the reservoir into which the feed pipe extends, a perforated disk secured in the reservoir for holding said packing under compression, a second fiber packing above the perforated disk, and a super-imposed leather disk through which the liquid fuel permeates to the aforesaid packings.

4. A self-heating implement for the purposes set forth comprising a reservoir-handle, a yoke connected thereto and having openings in its sides, a burner including a needle valve secured within the yoke and accessible through openings in the latter for adjusting the needle-valve, feed pipes extending from the reservoir to the burner, a fiber packing in the lower end of the reservoir into which the feed pipe extends, a perforated disk secured in the reservoir for holding said packing in place, and a leather disk through which the liquid fuel permeates to the packing; together with means at the outer end of the yoke for detachably connecting a soldering-head thereto.

5. A self-heating implement for the purposes set forth comprising a reservoir-handle, a yoke connected thereto and having openings in its sides, a burner including a needle valve secured within the yoke and accessible through openings in the latter for adjusting the needle-valve, a combined auxiliary reservoir and burner-tube within the yoke below the burner, feed pipes extending from the reservoir-handle to the auxiliary reservoir and from said auxiliary reservoir to the burner, a fiber packing in one end of the reservoir-handle into which the feed pipe extends, and a leather disk on top of the packing through which the liquid fuel permeates to said packing.

6. A self-heating implement for the purposes set forth comprising a reservoir-handle, a yoke connected thereto and having openings in its sides, a burner including a needle valve secured within the yoke and accessible through openings in the latter for adjusting the needle-valve, a hollow-ring within the yoke below the burner and having a perforated burner-tube depending therefrom, feed pipes extending from the reservoir-handle to the hollow ring and from the hollow ring to the burner, a fiber packing in one end of the reservoir-handle into which the feed pipe extends, a disk secured in the reservoir to hold said packing under compression and perforated for the passage of the liquid fuel, a second fiber packing above said perforated disk, and a superimposed leather packing through which the liquid fuel permeates to the packings.

7. A self-heating implement for the purposes set forth comprising a reservoir-handle, a yoke connected thereto and having openings in its sides, a burner including a needle valve secured within the yoke and accessible through openings in the latter for adjusting the needle-valve, a combined auxiliary reservoir and burner-tube within the yoke below the burner, feed pipes from the reservoir-handle to the auxiliary reservoir and from the latter to the burner, a fiber packing in an end of the reservoir handle in which the feed pipe extends, and a leather disk confining the packing and through which the liquid fuel permeates to said packing; together with means at the outer end of the yoke for detachably connecting a soldering-head thereto.

8. In a self-heating implement of the character described, the combination with a fuel reservoir, a burner, and means for holding the burner and reservoir in fixed relation; of means for supplying fuel from the reservoir to the burner including, a pipe having its admission end in communication with the reservoir, fuel absorbent means in the reservoir inclosing said admission end of the pipe and by which a quantity of fuel is adapted to be retained; and means for retaining said absorbent means in place.

9. In a self-heating implement of the character described, the combination with a fuel reservoir, a burner, and means for holding the burner and reservoir in assembled relation; of means for supplying fuel from the reservoir to the burner including, a pipe having an admission end in communication with said reservoir; and means, inclosing said admission end of the pipe, separating said end from the main body of fuel in the reservoir and adapted to retain a quantity of the fuel when the main body of the fuel is displaced to a position away from said means when the implement is held in certain positions.

10. In a self-heating implement of the character described, the combination with a fuel reservoir adapted to retain fuel under pressure, a burner, and means for supplying fuel from said reservoir to the burner including a pipe having an admission end in communication with the end of the reservoir which is lowest when the burner is in a position below the reservoir, of an absorbent packing in said end of the reservoir providing a permeable barrier which incloses said admission end of the pipe and which is also interposed between said admission end of the pipe and the main part of the reservoir, the fuel being forced under pressure through said barrier, and the permeable barrier, when the implement is held with the burner above the reservoir, retaining a quantity of the fuel adapted to be squeezed out into the admission end of the pipe, under pressure.

11. In a self-heating implement of the character described, the combination with a fuel reservoir, a burner, and means for supplying fuel from the reservoir to the burner and having included therein an admission opening in communication with the reservoir; of fuel absorbent means separate from and covering said opening; and fuel permeable means interposed between said absorbent means and the main body of the fuel.

12. In a self-heating implement of the character described, operable in any position, the combination with a fuel reservoir, means for creating pressure within the reservoir, and a burner, of means for conducting fuel from the reservoir to the burner including an admission opening in communication with the reservoir; and fuel absorbent means and independent permeable means extending over said admission opening and separating the latter from the main body of the fuel, both of said means being subject to pressure to squeeze fuel out from the absorbent means into the admission opening when the main body of the fuel is out of contact with said means.

RAYMOND C. PARENT.

Witness:
UNA C. GREGSBY.